United States Patent
Metz et al.

(10) Patent No.: US 11,247,601 B1
(45) Date of Patent: Feb. 15, 2022

(54) PARTIALLY COLLAPSIBLE GLAMPING AND LIVING UNIT

(71) Applicants: Darryl Clive Metz, Miami, FL (US); Cherise Mandy Metz, Miami, FL (US)

(72) Inventors: Darryl Clive Metz, Miami, FL (US); Cherise Mandy Metz, Miami, FL (US)

( * ) Notice: Subject to any disclaimer, the term of this patent is extended or adjusted under 35 U.S.C. 154(b) by 228 days.

(21) Appl. No.: 16/814,365

(22) Filed: Mar. 10, 2020

(51) Int. Cl.
*B60P 3/34* (2006.01)

(52) U.S. Cl.
CPC .................................. *B60P 3/341* (2013.01)

(58) Field of Classification Search
CPC .......... B60P 3/34; B60P 3/341; B62D 63/061; E04H 15/02; E04H 15/06
USPC ....... 296/173, 165, 172, 176, 26.15; 135/87, 135/88.01, 88.1, 88.15, 88.13, 97, 125, 135/126, 128, 115, 158, 137, 143, 148, 135/153, 116
See application file for complete search history.

(56) References Cited

U.S. PATENT DOCUMENTS

| | | | |
|---|---|---|---|
| 1,564,257 A | 12/1925 | Lippman | |
| 2,298,530 A * | 10/1942 | Fletcher | A45F 4/04 52/69 |
| 2,513,411 A | 3/1948 | Heil | |
| 3,489,452 A | 1/1970 | Plante | |
| 3,724,893 A | 4/1973 | Giroux | |
| 5,761,854 A * | 6/1998 | Johnson | B60P 3/34 135/116 |
| 8,562,066 B2 | 10/2013 | Holtkamp | |
| 2003/0146646 A1 | 8/2003 | Cerfenka | |
| 2015/0246699 A1 * | 9/2015 | Anabtawi | B60D 1/06 280/511 |
| 2016/0160522 A1 | 6/2016 | Schwebach | |
| 2019/0352923 A1 | 11/2019 | Harrison et al. | |

FOREIGN PATENT DOCUMENTS

| | | | | |
|---|---|---|---|---|
| CN | 105438053 A | * | 3/2016 | |
| CN | 110329136 | | 8/2019 | |
| DE | 3009614 | | 3/1980 | |
| DE | 202009007104 U1 | * | 10/2010 | ............... B60P 3/34 |
| DE | 202018100514 | | 1/2018 | |
| EP | 1162323 | | 8/2006 | |
| FR | 1503854 | | 10/1966 | |
| FR | 2327741 | | 5/1975 | |
| FR | 2532597 | | 9/1982 | |
| GB | 1194840 | | 12/1967 | |
| GB | 1596101 | | 8/1981 | |

(Continued)

OTHER PUBLICATIONS

Burkhard, "Translation of Description of DE202009007104", Nov. 18, 2010 (Year: 2010).*

(Continued)

*Primary Examiner* — Joseph D. Pape
*Assistant Examiner* — Veronica Marie Shull
(74) *Attorney, Agent, or Firm* — Dennis D. Brown; Brown Patent Law, P.L.L.C.

(57) ABSTRACT

A partially collapsible dwelling unit which has a non-collapsible central compartment, two foldable side decks, and two foldable side compartments and includes kitchen, bathroom, living, and sleeping facilities. The collapsible unit can be transported to and/or deployed in any location and can be used for glamping, or for emergency or temporary living purposes.

20 Claims, 6 Drawing Sheets

(56) References Cited

FOREIGN PATENT DOCUMENTS

| | | | | |
|---|---|---|---|---|
| GB | 1603402 | | 11/1981 | |
| GB | 2084943 | | 7/1984 | |
| GB | 2500946 | | 3/2014 | |
| KR | 101353408 | | 7/2012 | |
| KR | 101532912 | | 2/2014 | |
| KR | 101541394 | B1 * | 8/2015 | |
| KR | 10-2019-0108365 | | 3/2018 | |
| WO | WO-9965731 | A1 * | 12/1999 | ................ B60P 3/34 |
| WO | 2007042042 | | 4/2007 | |
| WO | WO-2020047275 | A1 * | 3/2020 | ............. E04H 15/08 |

OTHER PUBLICATIONS

PCT/US2021/018745—International Preliminary Report With International Search Report and Written Opinion; dated Apr. 22, 2021.

* cited by examiner

PARTIALLY COLLAPSIBLE GLAMPING AND LIVING UNIT

FIELD OF THE INVENTION

The present invention relates to a partially collapsible dwelling for recreational, emergency, or temporary living purposes.

BACKGROUND OF THE INVENTION

There is a growing need for more cost-effective, convenient, and eco-friendly glamping units which (a) provide the comforts and conveniences of home but (b) can be transported by individuals to, or can be set up by businesses in, desirable areas for sight-seeing, hiking, fishing, hunting, canoeing, mountain biking, staying at the beach, enjoying music festivals, or just relaxing.

Similarly, a need also exists for cost-effective, temporary accommodations which (a) can be used in the event of emergencies or can be set up in disaster areas and (b) will function as temporary homes with kitchens, bathrooms, and living and sleeping areas.

SUMMARY OF THE INVENTION

The present invention provides a partially collapsible glamping or living unit which is cost-effective, convenient, easily transportable, and eco-friendly. The inventive, partially collapsible glamping or living unit provides the comforts and conveniences of home and is well suited for outdoor recreational activities, or for use as a temporary home in the event of an emergency, a disaster, or in other situations.

In one aspect, there is provided a partially collapsible dwelling which preferably comprises: (a) a horizontal deck having a forward longitudinal end, a rearward longitudinal end, a right side and a left side; (b) a non-collapsible compartment which extends upwardly from the horizontal deck and includes a roof which covers the non-collapsible compartment; (c) a foldable right-side deck assembly comprising an inner deck panel which is pivotably connected to the right side of the horizontal deck and an outer deck panel which is pivotably connected to the outer side of the inner deck panel; (d) a collapsible right-side fabric or plastic compartment which extends from the right side of the non-collapsible compartment; (e) a foldable left-side deck assembly comprising an inner deck panel which is pivotably connected to the left side of the horizontal deck and an outer deck panel which is pivotably connected to the outer side of the inner deck panel of the foldable left-side deck assembly; and (f) a collapsible left-side fabric or plastic compartment which extends from the left side of the non-collapsible compartment.

In this partially collapsible dwelling, the foldable right-side deck assembly and the collapsible right-side fabric or plastic compartment are preferably foldable from (i) a deployed position, in which the inner and outer deck panels of the foldable right-side deck assembly extend horizontally, to (ii) a folded position, in which the inner deck panel extends upwardly and covers the right side of the non-collapsible compartment and the outer deck panel covers at least most of the right lateral half of the roof. Similarly, the foldable left-side deck assembly and the collapsible left-side fabric or plastic compartment are preferably foldable from (i) a deployed position, in which the inner and outer deck panels of the foldable left-side deck assembly extend horizontally, to (ii) a folded position, in which the inner deck panel of the foldable left-side deck assembly extends upwardly and covers the left side of the non-collapsible compartment and the outer deck panel of the foldable left side deck assembly covers at least most of the left lateral half of the roof.

In another aspect, there is provided a partially collapsible dwelling which preferably comprises: (a) a trailer comprising a horizontal deck mounted on a plurality of wheels, the horizontal deck having a forward end, a rearward end, a right side and a left side; (b) a non-collapsible compartment which extends upwardly from the horizontal deck and includes a roof which covers the non-collapsible compartment, the roof having a right lateral half and a left lateral half which each slope downwardly as they extend laterally outward; (c) a foldable right-side deck assembly comprising an inner deck panel which is pivotably connected to the right side of the horizontal deck and an outer deck panel which is pivotably connected to the outer side of the inner deck panel; (d) a collapsible right-side fabric or plastic compartment which extends from the right side of the non-collapsible compartment and has a bottom which is attached to the inner deck panel of the foldable right-side deck assembly; (e) a foldable left-side deck assembly comprising an inner deck panel which is pivotably connected to the left side of the horizontal deck and an outer deck panel which is pivotably connected to the outer side of the inner deck panel of the foldable left-side deck assembly; (f) a collapsible left-side fabric or plastic compartment which extends from the left side of the non-collapsible compartment and has a bottom which is attached to the inner deck panel of the foldable left-side deck assembly; (g) a bathroom area which is at least partially positioned in the non-collapsible compartment and includes a toilet installed or located on the horizontal deck; and (h) a kitchen area which is at least partially positioned in the non-collapsible compartment and includes a kitchen sink.

In this partially collapsible dwelling, the foldable right-side deck assembly and the collapsible right-side fabric or plastic compartment are preferably foldable from (i) a deployed position, in which the inner and outer deck panels extend horizontally, to (ii) a folded position, in which the inner deck panel extends upwardly and covers the right side of the non-collapsible compartment and the outer deck panel covers at least most of the right lateral half of the roof. Similarly, the foldable left-side deck assembly and the collapsible left-side fabric or plastic compartment are preferably foldable from (i) a deployed position, in which the inner and outer deck panels of the foldable left-side deck assembly extend horizontally, to (ii) a folded position, in which the inner deck panel of the foldable left-side deck assembly extends upwardly and covers the left side of the non-collapsible compartment and the outer deck panel of the foldable left-side deck assembly covers at least most of the left lateral half of the roof.

Further aspects, features, and advantages of the present invention will be apparent to those in the art upon examining the accompanying drawings and upon reading the following Detailed Description of the Preferred Embodiments.

DETAILED DESCRIPTION OF THE PREFERRED EMBODIMENTS

Figure 1:
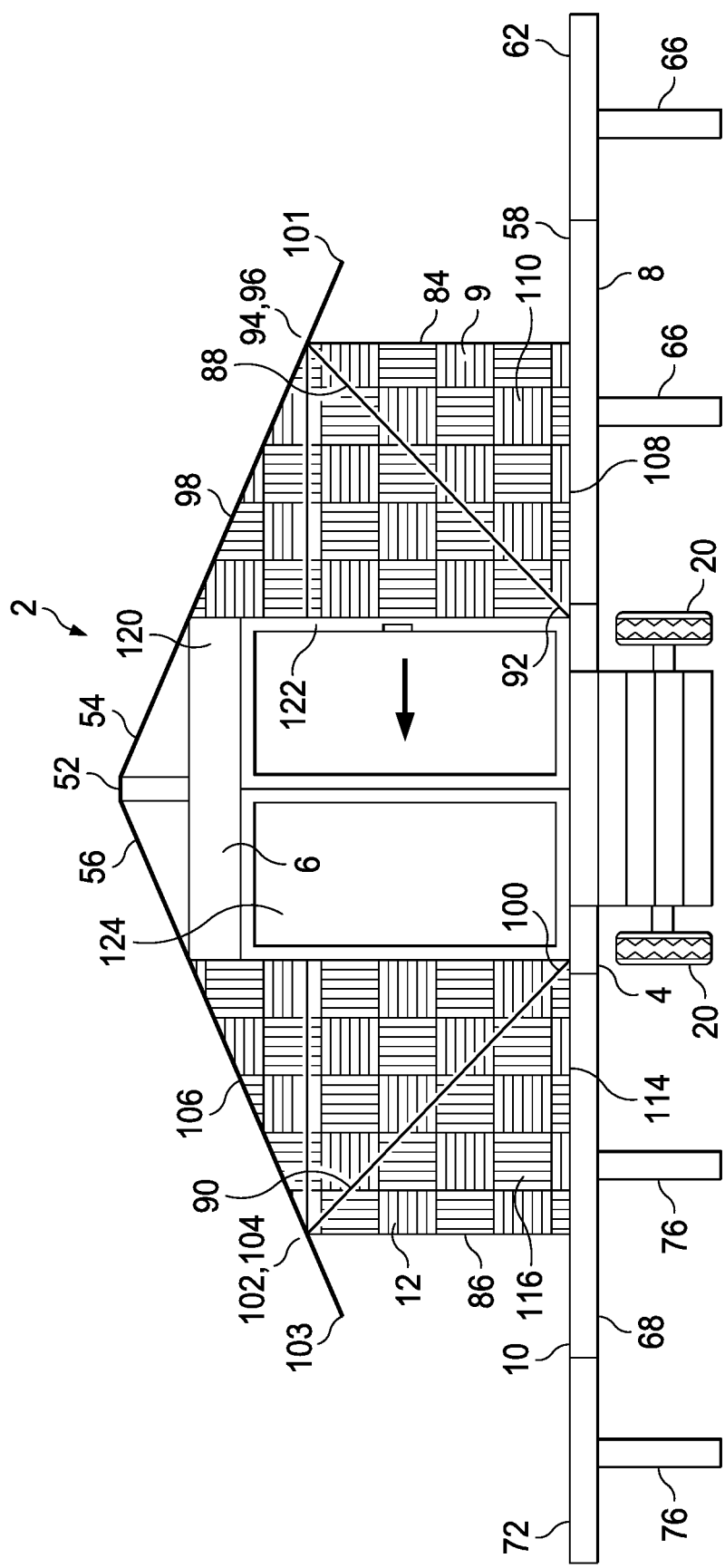
FIG. 1 is an elevational rear view of an embodiment 2 of the partially collapsible dwelling unit provided by the present invention, with the inventive unit 2 shown in a fully deployed position.

An embodiment 2 of the partially collapsible dwelling provided by the present invention is shown in FIGS. 1-7. The partially collapsible dwelling 2 preferably comprises: a central horizontal deck 4; a non-collapsible compartment 6 which is preferably installed in fixed position on the horizontal deck 4; a longitudinal axis 5 of the central horizontal deck 4; a foldable right-side deck assembly 8; a collapsible right-side fabric or plastic compartment 9; a foldable left-side deck assembly 10; a collapsible left-side fabric or plastic compartment 12; a utility area and/or compartment 14 on the central horizontal deck 4; and a foldable set of one or more steps 16.

The embodiment 2 of the inventive, partially collapsible dwelling as shown in the drawings is a trailer comprising a forward towing hitch 18 and a plurality of wheels 20 on which the central horizontal deck 4 is mounted. Alternatively, the central horizontal deck 4 could be mounted on the ground, preferably on a plurality of support piles, or could be mounted on a barge, a pontoon boat, or other transport vehicle.

The utility area and/or compartment 14 is preferably located at the forward longitudinal end 22 of the central horizontal deck 4 behind (i.e., rearwardly of) the towing hitch 18. The utility area and/or compartment 14 can contain (a) a stand and gas connections for a propane tank or other gas fuel tank 15 and/or (b) an electrical power generator (which could alternatively be transported in the collapsible dwelling 2 or in the user's vehicle and then set up outside of collapsible dwelling 2 for use). The inventive dwelling 2 will also include an electrical power cord connection for connecting the inventive unit 2 to a generator or to an external electrical power outlet when available.

A wind cone 17, e.g., of the type commonly used on trailers and trucks, is preferably provided on the forward end 19 of the non-collapsible compartment 6 above the utility area/compartment 14 to reduce wind resistance and increase fuel efficiency during transport.

The non-collapsible compartment 6, which is positioned on and extends upwardly from the central horizontal deck 4, preferably comprises: at least a portion of a bathroom area 24; at least a portion of a kitchen area 26; and a living and/or sleeping area 25. The bathroom 24 and kitchen 26 are preferably located at or near the forward longitudinal end 22 of the central horizontal deck 4 behind the forward utility area and/or compartment 14.

The bathroom 24 preferably comprises: a rearward privacy wall 28 having a door 30 therein; left and right privacy walls 32 and 34; a toilet 36 installed or located on the central horizontal deck 4; a shower 38 installed on the central horizontal deck 4; and a bathroom counter 40 having a bathroom sink 42 installed therein. The toilet 36 can be a gravity flush toilet, a composting toilet, or any other toilet of the type used, for example, in recreational vehicles or recreational trailers.

The kitchen 26 preferably includes: a gas or electric stove and oven 44; a small or full size refrigerator/freezer 45; and a kitchen counter 46 with a sink 48.

Water for the bathroom 24 and the kitchen 26 can be supplied by (a) a water tank and pump located in the utility area 14 or elsewhere on or under the central horizontal deck 4 and/or (b) a hose connection to a faucet or other external water source when available. Hot water for the bathroom 24 and the kitchen 26 can be supplied by a tank or tankless water heater 50, installed in the non-collapsible compartment 6, which can be of any type used, for example, in recreational vehicles or recreational trailers.

Water from the bathroom sink 42 and the kitchen sink 48 will drain to a grey water holding tank (not shown) which is preferably secured beneath the central horizontal deck 4. The toilet 36 can drain to a separate black water holding tank (not shown) which is also preferably installed beneath the central horizontal deck 4. As with other recreational vehicles and trailers, the grey water holding tank and the black water holding tank will each include a drainage hose connection for draining the tanks to a sewer inlet, when available.

The non-collapsible compartment 6 of the inventive unit 2 also preferably comprises a fixed roof 52 which covers the top of the fixed, non-collapsible compartment 6. The roof 52 is preferably in the form a gable type roof having (a) a right lateral half 54 which slopes downwardly as it extends laterally outward to the right and (b) a left lateral half 56 which slopes downwardly as it extends laterally outward to the left. The roof 52 of the non-collapsible compartment 6 will preferably be covered with the same type of fabric or plastic used, as discussed below, for forming the collapsible right-side fabric or plastic compartment 9 and the collapsible left-side fabric or plastic compartment 12.

Figure 3:
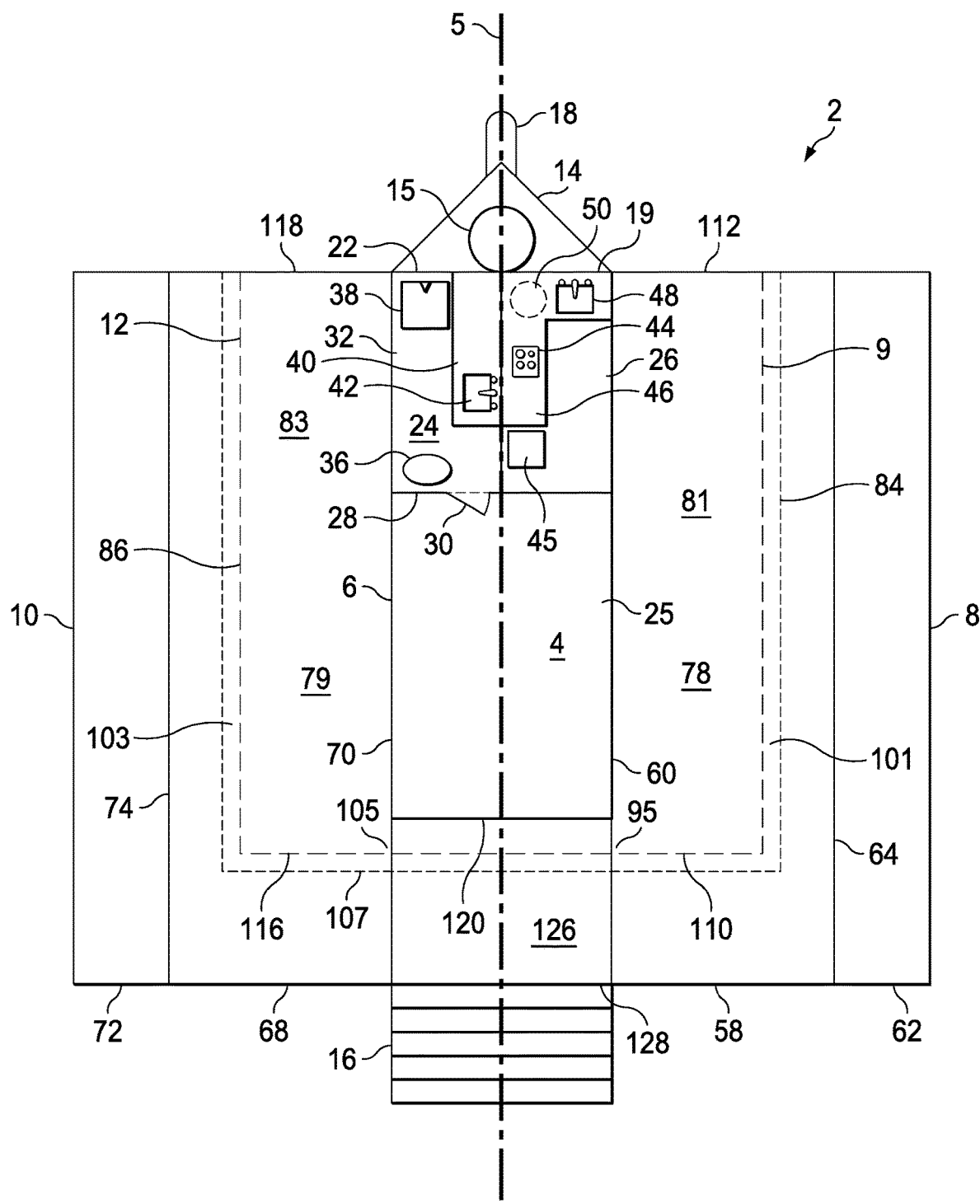
FIG. 3 is a top cutaway view of the fully deployed dwelling unit 2.

The foldable right-side deck assembly 8 preferably comprises an inner deck panel 58, which is pivotably connected to and along the right side 60 of the central horizontal deck 4, and an outer deck panel 62, which is pivotably connected to and along the outer side 64 of the inner deck panel 58. The foldable right-side deck assembly 8 and the collapsible right-side fabric or plastic compartment 9 can be placed in a deployed (unfolded) position as illustrated in FIGS. 1 and 3 in which the inner deck panel 58 and the outer deck panel 62 of the right-side deck assembly 8 extend horizontally outward to the right. A plurality of leveling stands 66 are pivotably attached or removably attachable beneath the inner and outer deck panels 58 and 62 to support the panels 58 and 62 above the ground in the deployed position, and to level the inner and outer panels 58 and 62 in relationship to the central horizontal panel 4.

Figure 2:
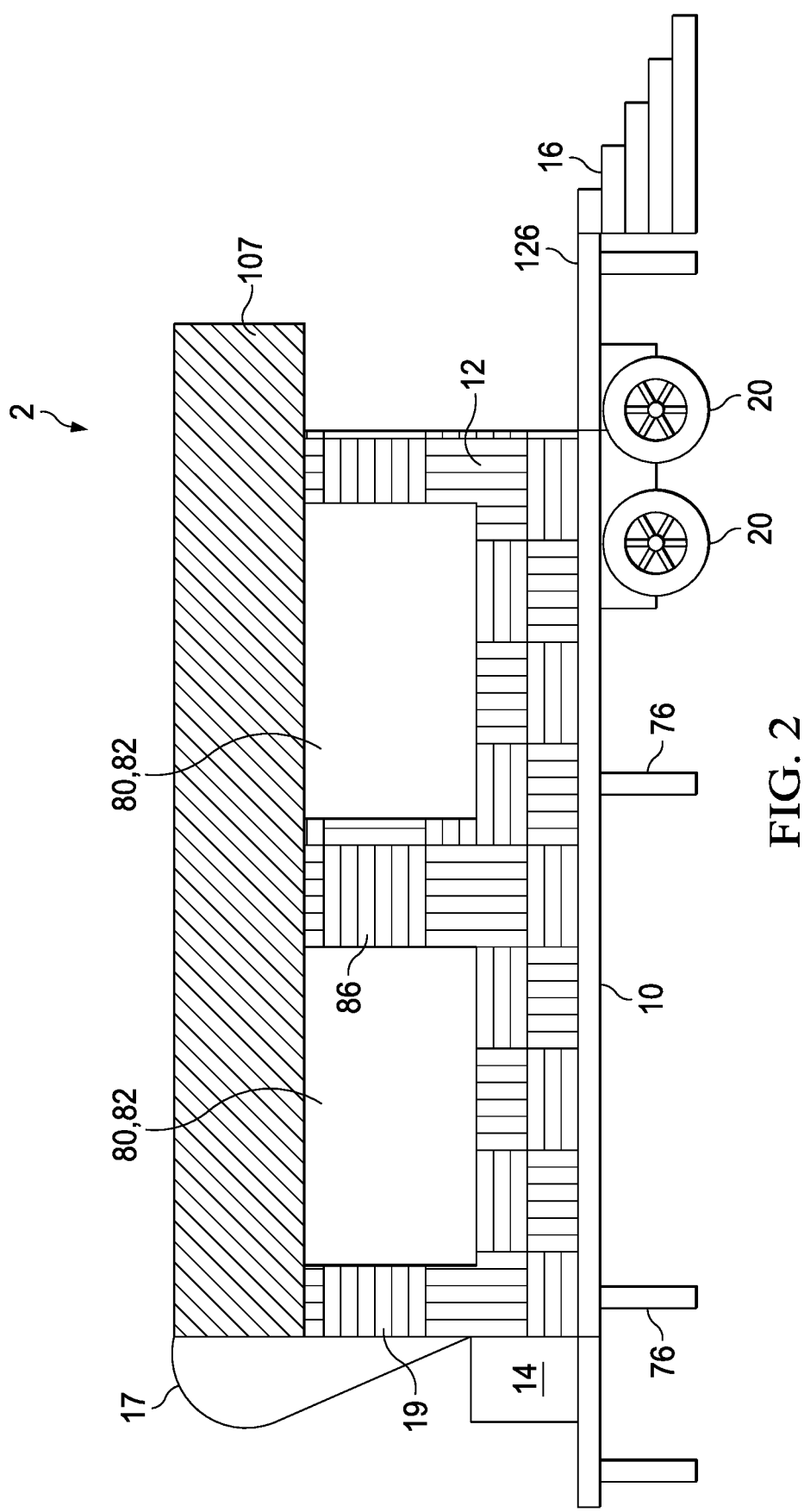
FIG. 2 is an elevational left side view of the fully deployed dwelling unit 2.

In the same way, the foldable left-side deck assembly 10 preferably comprises an inner deck panel 68 which is pivotably connected to and along the left side 70 of the central horizontal deck 4 and an outer deck panel 72 which is pivotably connected to and along the outer side 74 of the inner deck panel 68. The foldable left-side deck assembly 10 and the collapsible left-side fabric or plastic compartment 12 can also be placed in a deployed (unfolded) position as illustrated in FIGS. 1-3 in which the inner deck panel 68 and the outer deck panel 72 of the left-side deck assembly 10 extend horizontally outward to the left. A plurality of leveling stands 76 are pivotably attached or removably attachable beneath the inner and outer deck panels 68 and 72 to support the panels 68 and 72 above the ground in the deployed position, and to level the inner and outer panels 68 and 72 in relationship to the central horizontal panel 4.

Each of the collapsible right-side and left-side fabric or plastic compartments 9 and 12 is preferably a collapsible tent-like compartment which can be placed in a raised position, as illustrated in FIGS. 1 and 2, when the foldable right-side and left side deck assemblies 8 and 10 and the collapsible right-side and left-side fabric or plastic compartments 9 and 12 are deployed. When deployed and raised, each of the collapsible right-side and left-side fabric or plastic compartments 9 and 12 has a living and/or sleeping area 78, 79 therein. In addition, a forward portion 81 of the collapsible right-side compartment 9 can be used as a dining area and/or an extension of the kitchen 26. Similarly, a forward portion 83 of the collapsible left-side compartment 12 can be used as an extension of the bathroom 24.

By way of example, but not by way of limitation, the collapsible right-side and left-side fabric or plastic compartments 9 and 12 will preferably be formed of waterproof polyester fabric, nylon fabric, canvas, sailcloth, hemp fabric, flax fabric, cotton fabric, or a combination thereof. Each of the collapsible right-side and left-side fabric or plastic compartments 9 and 12 preferably also has one or more tent windows 80, with fabric or plastic covers 82, in the collapsible outer side wall 84, 86 thereof.

Each of the collapsible right-side and left-side fabric or plastic compartments 9 and 12 is held and supported in its raised position by a plurality of poles or other elongate supports 88, 90 which are located inside and/or outside of the collapsible compartments 9 and 12.

The poles or other elongate supports 88 used to hold the collapsible right-side compartment 9 in raised position each have (i) a lower end 92 which is attached to or engages the central horizontal deck 4, or is attached to or engages a bottom portion of the right side 95 of the non-collapsible compartment 6, and (ii) an outer end 94 which is attached to or engages an interior or an exterior support point 96 of the collapsible right-side compartment 9 to thereby hold the collapsible right-side compartment 9 in its raised position. Each support point 96 of the collapsible right-side fabric or plastic compartment 9 is preferably located along the "line" defined by the junction or seam between a sloped roof 98 and the upper end of the outer wall 84 of the collapsible right-side fabric or plastic compartment 9.

Similarly, the poles or other elongate supports 90 used to hold the collapsible left-side compartment 12 in raised position each have (i) a lower end 100 which is attached to or engages the central horizontal deck 4, or is attached to or engages a bottom portion of the left side 105 of the non-collapsible compartment 6, and (ii) an outer end 102 which is attached to or engages an interior or an exterior support point 104 of the collapsible left-side fabric or plastic compartment 12 to thereby hold the collapsible left-side compartment 12 in its raised position. Each support point 104 of the collapsible left-side fabric or plastic compartment 12 is preferably located along the "line" defined by the junction or seam between a sloped roof 106 and the upper end of the outer wall 86 of the collapsible left-side fabric or plastic compartment 12.

It will be understood that, due to the collapsible nature of the right-side and left-side fabric or plastic compartments 9 and 12, each of the support "lines" referred to in the previous two paragraphs may sag to some degree when the collapsible right-side and left-side fabric or plastic compartments 9 and 12 are deployed and raised.

The collapsible right-side fabric or plastic compartment 9 (i) extends laterally outward from the right side 95 of the non-collapsible compartment 6 and (ii) has a bottom edge 108 which extends along the bottoms of the outer, rearward, and forward walls 84, 110, and 112 of the collapsible right-side compartment 9. The bottom 108 of the collapsible right-side compartment 9 is permanently attached, or can alternatively be removably attachable, to the inner deck panel 58 of the foldable right-side deck assembly 8. When the collapsible right-side compartment 9 is deployed and raised, the outer deck panel 62 of the foldable right-side deck assembly 8, as well as any remaining portion of the inner deck panel 58 which is not covered by the collapsible right-side compartment 9, provide an exterior deck surface outside of the collapsible right-side compartment 9.

Similarly, the collapsible left-side fabric or plastic compartment 12 (i) extends laterally outward from the left side 105 of the non-collapsible compartment 6 and (ii) has a bottom edge 114 which extends along the bottoms of the outer, rearward, and forward walls 86, 116, and 118 of the collapsible left-side compartment 12. The bottom 114 of the collapsible left-side compartment 12 is preferably permanently attached, or can alternatively be removably attachable, to the inner deck panel 68 of the foldable left-side deck assembly 10. When the collapsible left-side compartment 10 is deployed and raised, the outer deck panel 72 of the foldable left-side deck assembly 10, as well as any remaining portion of the inner deck panel 68 which is not covered by the collapsible left-side compartment 12, provide an exterior deck surface outside of the collapsible left-side compartment 12.

As mentioned above, each of the collapsible right-side and left-side fabric or plastic compartments 9, 12 has a roof 98, 106 which slopes downwardly as it extends laterally outward. The pitch of the roofs 98 and 106 is preferably the same as the pitch of the right and left lateral halves 54, 56 of the fixed roof 52 of the fixed, non-collapsible compartment 6. In addition, when the collapsible right-side and left-side compartments 9 and 12 are deployed and raised, overhangs or awnings 101, 103, and 107 extend outwardly, respectively, from (a) the outer right side of the roof 98 of the right-side compartment 9, (b) the outer left side of the roof 106 of the left-side compartment 12, and (c) the rearward ends of the roof 98 of the right-side compartment 9, the roof 106 of the left-side compartment 12, and the fixed roof 52 of the non-collapsible compartment 6. The overhangs 101, 103, 107 can be held in place, e.g., by poles and/or by cords or ropes extending to the outer deck panels 62 and 72.

Figure 4:
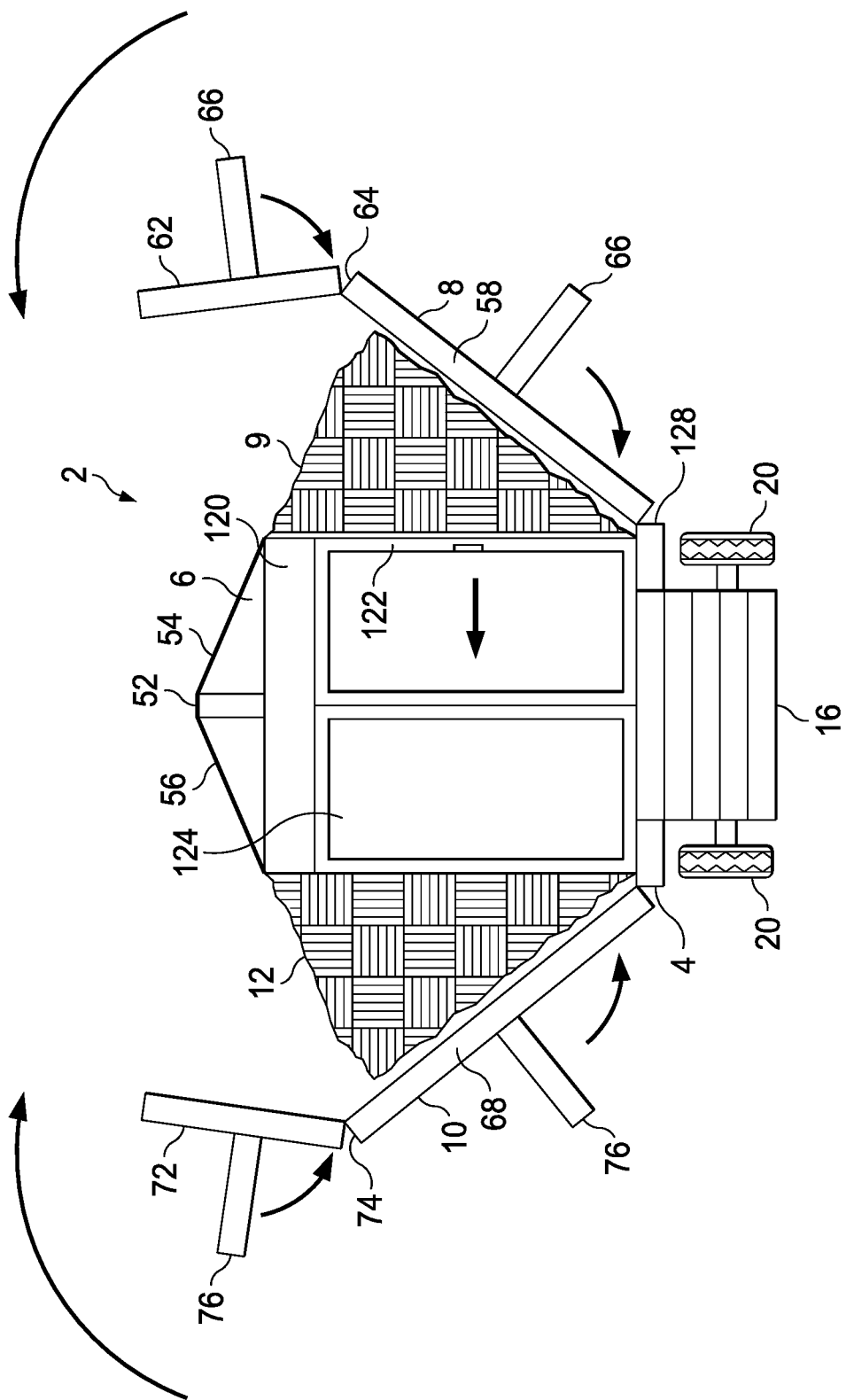
FIG. 4 is an elevational rear view of the inventive dwelling unit 2, with the inventive unit 2 shown in an intermediate folded position.
Figure 5:
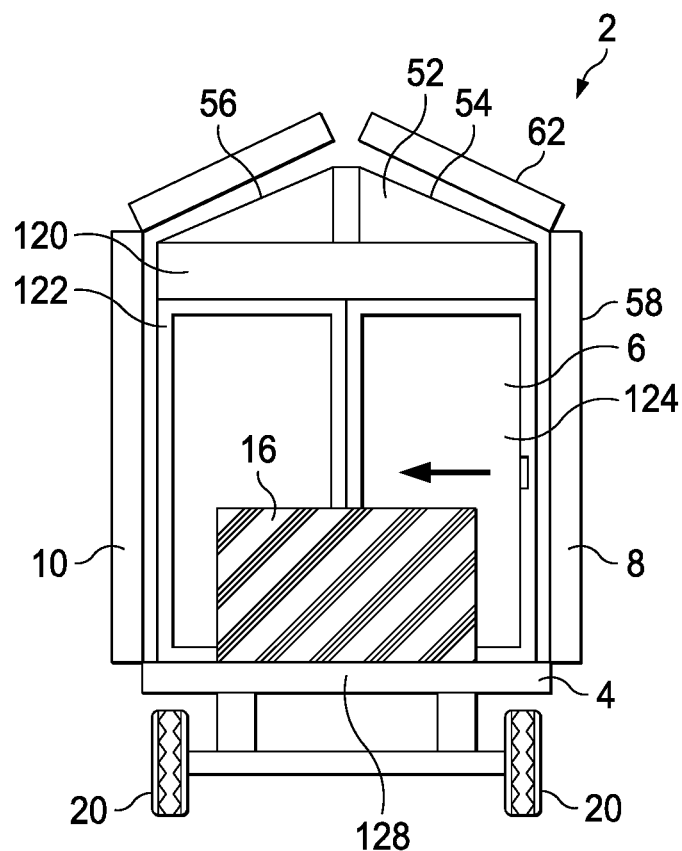
FIG. 5 is an elevational rear view of the inventive dwelling unit 2, with the inventive unit 2 shown in a fully folded position for transport.
Figure 7:
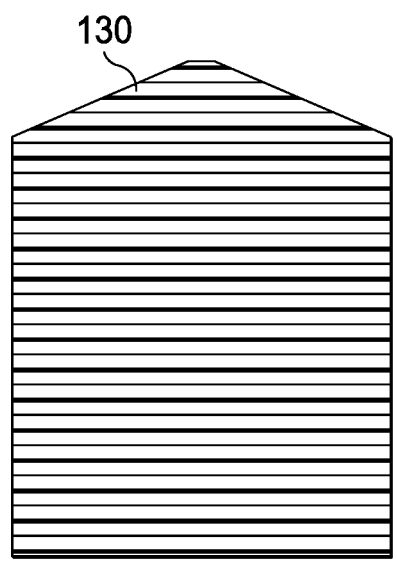
FIG. 7 is an elevational view of a rear cover 130 for the inventive partially collapsible dwelling unit 2.

The foldable right-side deck assembly 8 of the inventive, partially collapsible dwelling 2 can be folded upwardly from its deployed (unfolded, horizontal) position to an intermediate folded position as illustrated in FIG. 4, and then on to a fully folded position as illustrated in FIG. 5. In the fully folded position, the inner deck panel 58 of the right-side deck assembly 8 extends upwardly and covers the right side 95 of the non-collapsible compartment 6 and the outer deck panel 62 of the right-side deck assembly 8 covers at least most, preferably all, of the right lateral half 54 of the roof 52 of the non-collapsible compartment 6. As the right-side deck assembly 8 is folded upwardly, the collapsible right-side compartment 9 collapses between the right-side deck assembly 8 and non-collapsible compartment 6 so that the collapsible right-side compartment 9 is covered and protected within the right-side deck assembly 8 when the deck assembly 8 is completely folded.

Figure 6:
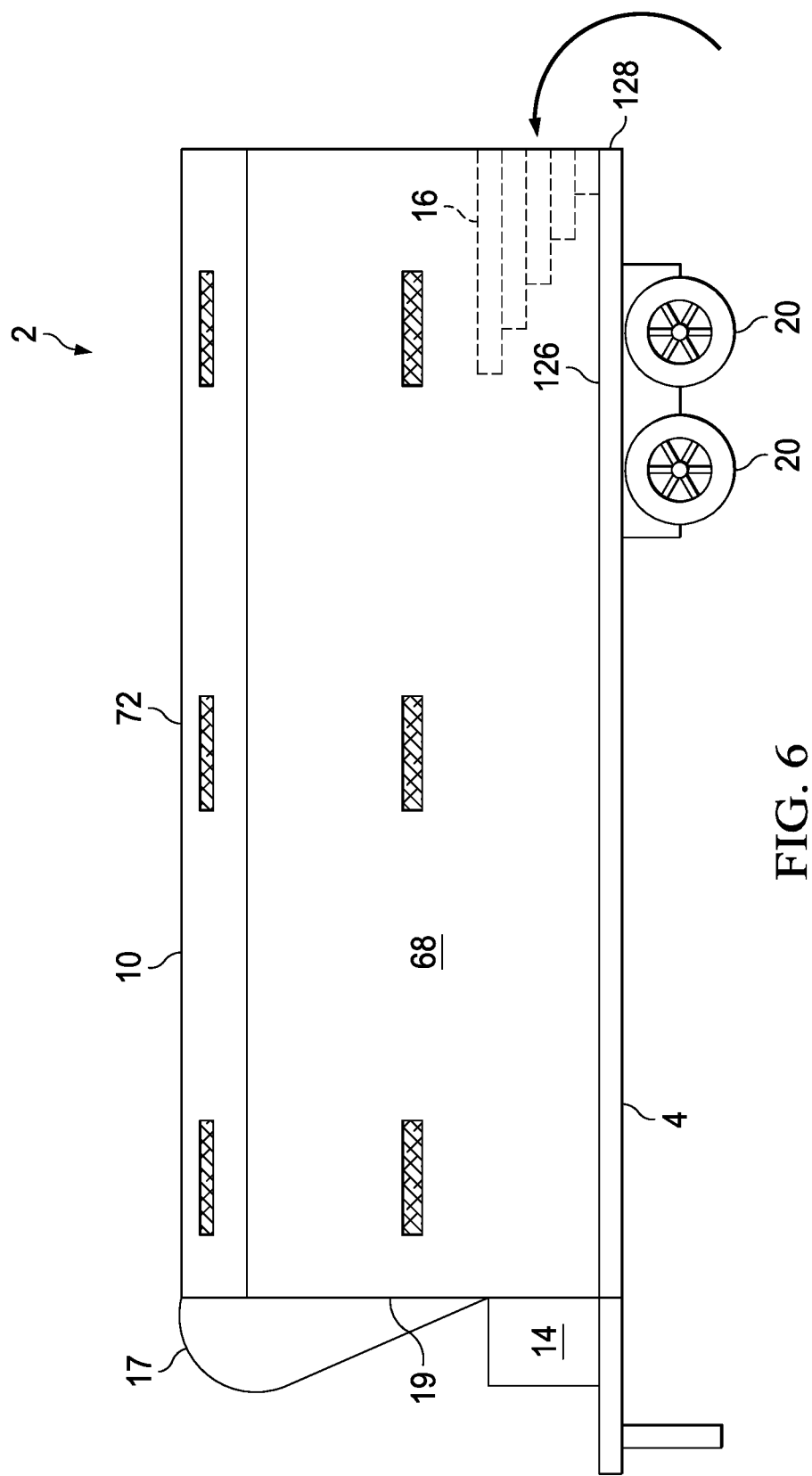
FIG. 6 is an elevational left side view of the fully folded dwelling unit 2.

Similarly, the foldable left-side deck assembly 10 of the inventive collapsible dwelling 2 can be folded upwardly from its deployed (unfolded, horizontal) position to an intermediate folded position as illustrated in FIG. 4, and then on to a fully folded position as illustrated in FIGS. 5 and 6. In the fully folded position, the inner deck panel 68 of the left-side deck assembly 10 extends upwardly and covers the left side 105 of the non-collapsible compartment 6 and the outer deck panel 72 of the left-side deck assembly 10 covers at least most, preferably all, of the left lateral half 56 of the roof 52 of the non-collapsible compartment 6. As the left-side deck assembly 10 is folded upwardly, the collapsible left-side compartment 12 collapses between the left-side deck assembly 10 and non-collapsible compartment 6 so that the collapsible left-side compartment 12 is covered by and protected within the left-side deck assembly 10 when the deck assembly 10 is completely folded.

The poles or other elongate supports 88 and 90 used for supporting the collapsible right-side and left-side compartments 9 and 12 in raised position can be removably positionable in and/or outside of the collapsible compartments 9 and 12. Alternatively, the lower ends 92 or 100 of some or all of the poles or other elongate supports 88, 90 can be pivotably attached to the central horizontal deck 4 or to the non-collapsible compartment 6 so that the poles 88, 90 remain in place and pivot inwardly toward the non-collapsible compartment 6 as the foldable right-side and left-side deck assemblies 8 and 10 are pivoted upwardly and inwardly to their fully folded positions. If the poles/elongate supports 88 and 90 are not removed during folding, the poles/elongate supports 88 and 90 will be short enough, or will be in the form of telescoping or other collapsible structures, such that the poles/elongate supports 88 and 90 will not interfere with the folding process and will fit, along with the collapsible right-side and left-side compartments 9 and 12, within the folded right-side and left-side deck assemblies 8 and 10 for transport and storage.

When in folded position, the outer edges of the outer deck panels 62 and 72 of the foldable right-side and left-side deck assemblies 8 and 10 can be removably joined together, or can be attached together with bolts and L-brackets, or by any other suitable means, for holding the right-side and left-side deck assemblies 8 and 10 in folded position for storage or transport.

The rearward end 120 of the non-collapsible compartment 6 preferably comprises a vertical wall having a door frame 122 and door 124 installed therein. The door 124 is preferably a glass or clear sliding door. The central horizontal deck 4 extends rearwardly beyond the non-collapsible compartment 6 to provide a porch area 126 leading to the door 124. The foldable right and left side deck panels 58, 62, 68, and 72 also extend rearwardly beyond the non-collapsible compartment 6, and beyond the collapsible right-side and left-side compartments 9 and 12, to extend the porch area 126 laterally outward on each side.

The foldable set of one or more steps 16 used in the partially collapsible dwelling 2 is pivotably attached to the rearward end 128 of the central horizontal deck 4 so that (i) the steps 16 can be pivoted downwardly to a deployed position for stepping up onto the rear porch area 126 and (ii) pivoted upwardly onto the porch area 126 to a stowed position for transport.

When the right-side and left-side deck assemblies 8 and 10 are in their fully folded positions and the steps 16 are in their upward stowed position on the rear porch area 126, a cover 130, secured by bolts and brackets or any other suitable means, is preferably positioned on the rearward end of the inventive, partially collapsible dwelling 2 in order to seal the inventive unit 2 for storage or transport.

Although the inventive, partially collapsible dwelling unit 2 has been described as having a foldable deck assembly 8 or 10 and a collapsible fabric or plastic compartment 9 or 12 on both the right lateral side and the left lateral side of the unit 2, it will be understood that the inventive dwelling unit could alternatively have, for example, (a) a foldable deck assembly and a collapsible fabric or plastic compartment on only one lateral side or (b) a foldable deck assembly on each lateral side with a collapsible fabric or plastic compartment on only one lateral side.

Thus, the present invention is well adapted to carry out the objectives and attain the ends and advantages mentioned above as well as those inherent therein. While presently preferred embodiments have been described for purposes of this disclosure, numerous changes and modifications will be apparent to those in the art. Such changes and modifications are encompassed within the invention as defined by the claims.

What is claimed is:

1. A partially collapsible dwelling comprising:
   a horizontal deck having a forward longitudinal end, a rearward longitudinal end, a right side and a left side;
   a non-collapsible compartment which extends upwardly from the horizontal deck and includes a roof which covers the non-collapsible compartment;
   a foldable right-side deck assembly comprising an inner deck panel which is pivotably connected to the right side of the horizontal deck and an outer deck panel which is pivotably connected to an outer side of the inner deck panel,
   a collapsible right-side fabric or plastic compartment which extends from a right side of the non-collapsible compartment;
   the foldable right-side deck assembly and the collapsible right-side fabric or plastic compartment being foldable from (i) a deployed position in which the inner and outer deck panels extend horizontally to (ii) a folded position in which the inner deck panel extends upwardly and covers the right side of the non-collapsible compartment and the outer deck panel covers at least most of a right lateral half of the roof;
   a foldable left-side deck assembly comprising an inner deck panel which is pivotably connected to the left side of the horizontal deck and an outer deck panel which is pivotably connected to an outer side of the inner deck panel of the foldable left-side deck assembly;
   a collapsible left-side fabric or plastic compartment which extends from a left side of the non-collapsible compartment; and
   the foldable left-side deck assembly and the collapsible left-side fabric or plastic compartment being foldable from (i) a deployed position in which the inner and outer deck panels of the foldable left-side deck assembly extend horizontally to (ii) a folded position in which the inner deck panel of the foldable left-side deck assembly extends upwardly and covers the left side of the non-collapsible compartment and the outer deck panel of the foldable left side deck assembly covers at least most of a left lateral half of the roof.

2. The partially collapsible dwelling of claim 1 in which the right lateral half and the left lateral half of the roof of the non-collapsible compartment slope downwardly as they extend laterally outwardly.

3. The partially collapsible dwelling of claim 1 in which:
the collapsible right-side fabric or plastic compartment has a bottom which is attached to the inner deck panel of the foldable right-side deck assembly and
the collapsible left-side fabric or plastic compartment has a bottom which is attached to the inner deck panel of the foldable left-side deck assembly.

4. The partially collapsible dwelling of claim 1 further comprising:
a bathroom area which is at least partially located in the non-collapsible compartment and includes a toilet installed or located on the horizontal deck and
a kitchen area which is at least partially located in the non-collapsible compartment and includes a kitchen sink.

5. The partially collapsible dwelling of claim 4 further comprising a shower which is installed in the bathroom area on the horizontal deck.

6. The partially collapsible dwelling of claim 1 in which a door frame and a door are provided in a rearward longitudinal end of the non-collapsible compartment.

7. The partially collapsible dwelling of claim 6 in which the door is a sliding door.

8. The partially collapsible dwelling of claim 1 in which the horizontal deck is mounted on a plurality of wheels.

9. The partially collapsible dwelling of claim 8 in which the collapsible dwelling is a trailer.

10. The partially collapsible dwelling of claim 1 in which the horizontal deck includes a rearward porch area which extends rearwardly beyond a rearward longitudinal end of the non-collapsible compartment.

11. The partially collapsible dwelling of claim 10 further comprising a set of one or more steps which is pivotably connected to the rearward longitudinal end of the horizontal deck, is downwardly pivotable to a deployed position, and is upwardly pivotable to a stowed position on the rearward porch area.

12. The partially collapsible dwelling of claim 1 further comprising:
a plurality of poles or other elongate supports in and/or outside of the collapsible right-side fabric or plastic compartment which each have (i) a lower end which is attached to or engages the horizontal deck, or is attached to or engages a bottom portion of the right side of the non-collapsible compartment, and (ii) an outer end which is attached to or engages an interior or an exterior support point of the collapsible right-side fabric or plastic compartment which holds the collapsible right-side fabric or plastic compartment in a raised position when the collapsible right-side fabric or plastic compartment is in its said deployed position and
a plurality of poles or other elongate supports in and/or outside of the collapsible left-side fabric or plastic compartment which each have (i) a lower end which is attached to or engages the horizontal deck, or is attached to or engages a bottom portion of the left side of the non-collapsible compartment, and (ii) an outer end which is attached to or engages an interior or an exterior support point of the collapsible left-side fabric or plastic compartment which holds the collapsible left-side fabric or plastic compartment in a raised position when the collapsible left-side fabric or plastic compartment is in its deployed position.

13. The partially collapsible dwelling of claim 12 in which:
each said support point of the collapsible right-side fabric or plastic compartment is located along a line of a junction or seam of a sloped roof and an outer wall of the collapsible right-side fabric or plastic compartment and
each said support point of the collapsible left-side fabric or plastic compartment is located along a line of a junction or seam of a sloped roof and an outer wall of the collapsible left-side fabric or plastic compartment.

14. The partially collapsible dwelling of claim 1 in which the collapsible right-side fabric or plastic compartment and the collapsible left-side fabric or plastic compartment are formed of polyester fabric, nylon fabric, canvas, sailcloth, hemp fabric, flax fabric, cotton fabric or a combination thereof.

15. The partially collapsible dwelling of claim 1 in which the collapsible right-side fabric or plastic compartment and the collapsible left-side fabric or plastic compartment each have a collapsible outer wall with a tent window therein.

16. The partially collapsible dwelling of claim 1 in which the roof of the non-collapsible compartment is covered with a fabric.

17. A partially collapsible dwelling comprising:
a trailer comprising a horizontal deck mounted on a plurality of wheels, the horizontal deck having a forward end, a rearward end, a right side and a let side;
a non-collapsible compartment which extends upwardly from the horizontal deck and includes a fixed roof which covers the non-collapsible compartment, the roof having a right lateral half and a left lateral half which each slope downwardly as they extend laterally outward;
a foldable right-side deck assembly comprising an inner deck panel which is pivotably connected to the right side of the horizontal deck and an outer deck panel which is pivotably connected to an outer side of the inner deck panel;
a collapsible right-side fabric or plastic compartment which extends from the right side of the non-collapsible compartment and has a bottom which is attached to the inner deck panel of the foldable right-side deck assembly;
the foldable right-side deck assembly and the collapsible right-side fabric or plastic compartment being foldable from (i) a deployed position in which the inner and outer deck panels extend horizontally to (ii) a folded position in which the inner deck panel extends upwardly and covers the right side of the non-collapsible compartment and the outer deck panel covers at least most of the right lateral half of the roof;
a foldable left-side deck assembly comprising an inner deck panel which is pivotably connected to the left side of the horizontal deck and an outer deck panel which is pivotably connected to an outer side of the inner deck panel of the foldable left-side deck assembly;
a collapsible left-side fabric or plastic compartment which extends from the left side of the non-collapsible compartment and has a bottom which is attached to the inner deck panel of the foldable left-side deck assembly;
the foldable left-side deck assembly and the collapsible left-side fabric or plastic compartment being foldable from (i) a deployed position in which the inner and outer deck panels of the foldable left-side deck assembly extend horizontally to (ii) a folded position in which the inner deck panel of the foldable left-side deck assembly extends upwardly and covers the left side of the non-collapsible compartment and the outer deck panel of the foldable left-side deck assembly covers at least most of the left lateral half of the roof;

a bathroom area which is at least partially located in the non-collapsible compartment and includes a toilet installed or located on the horizontal deck; and a kitchen area which is at least partially located in the non-collapsible compartment and includes a kitchen sink.

18. The partially collapsible dwelling of claim 17 further comprising:

a plurality of poles or other elongate supports in and/or outside of the collapsible right-side fabric or plastic compartment which each have (i) a lower end which is pivotably attached to the horizontal deck, or is pivotably attached to a bottom portion of the right side of the non-collapsible compartment, and (ii) an outer end which is attached to or engages an interior or an exterior support point of the collapsible right-side fabric or plastic compartment which holds the collapsible right-side fabric or plastic compartment in a raised position when the collapsible right-side fabric or plastic compartment is in its said deployed position and a plurality of poles or other elongate supports in and/or outside of the collapsible left-side fabric or plastic compartment which each have (i) a lower end which is pivotably attached to the horizontal deck, or is pivotably attached to a bottom portion of the left side of the non-collapsible compartment, and (ii) an outer end which is attached to or engages an interior or an exterior support point of the collapsible left-side fabric or plastic compartment which holds the collapsible left-side fabric or plastic compartment in a raised position when the collapsible left-side fabric or plastic compartment is in its deployed position.

19. The partially collapsible dwelling of claim 17 in which a rearward end of the non-collapsible compartment is a closed end with a sliding door therein.

20. The partially collapsible dwelling of claim 17 in which:

the horizontal deck includes a rearward porch area which extends rearwardly beyond a rearward end of the non-collapsible compartment and the partially collapsible dwelling further comprises a set of one or more steps which is pivotably connected to the rearward end of the horizontal deck, is downwardly pivotable to a deployed position, and is upwardly pivotable to a stowed position on the rearward porch area.

\* \* \* \* \*